Figure 1:
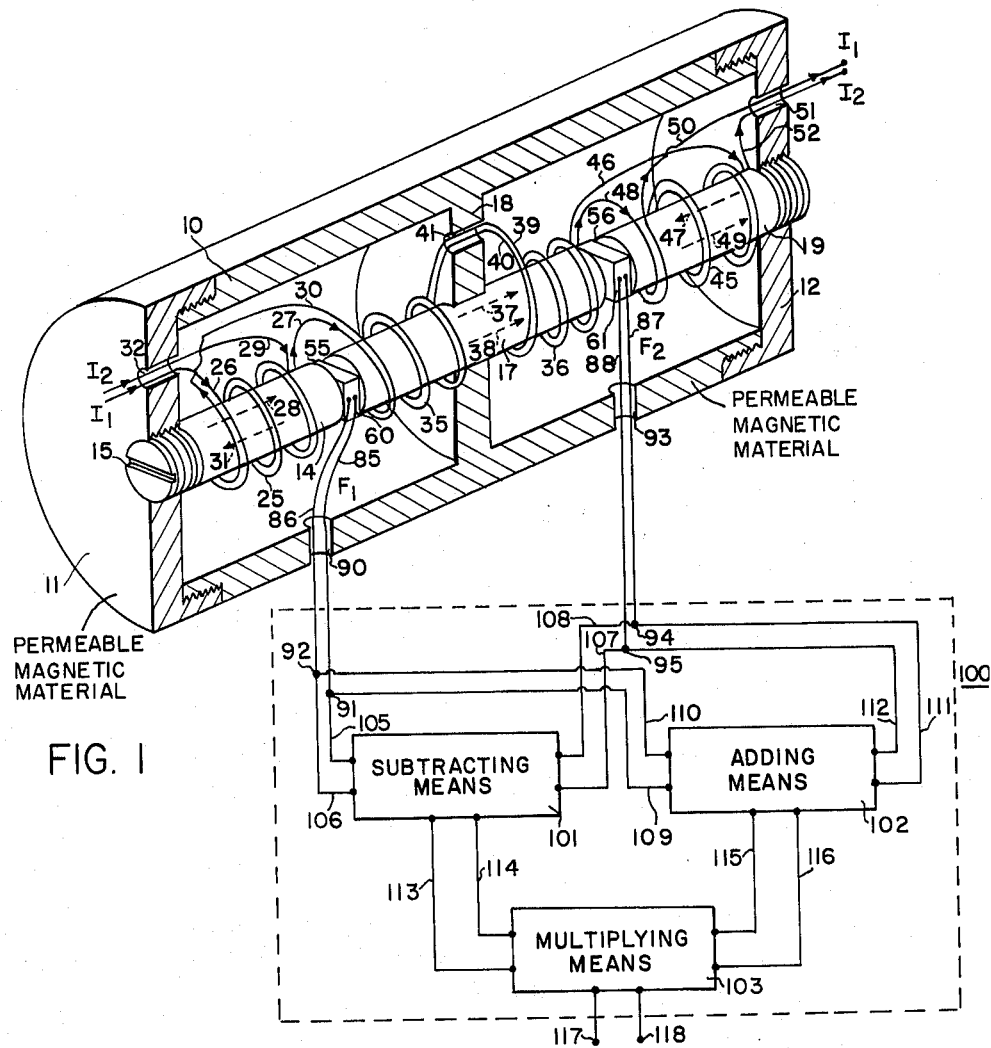

July 5, 1966 P. D. SENSTAD 3,259,735
ARITHMETIC COMPUTATION USING A NUCLEAR MAGNETIC RESONANCE
ANALOG TO DIGITAL CONVERTER
Filed Dec. 31, 1962

INVENTOR.
PAUL D. SENSTAD
BY
Roger W. Jensen
ATTORNEY

United States Patent Office 3,259,735
Patented July 5, 1966

3,259,735
ARITHMETIC COMPUTATION USING A NUCLEAR MAGNETIC RESONANCE ANALOG TO DIGITAL CONVERTER
Paul D. Senstad, Golden Valley, Minn., assignor to Honeywell Inc., a corporation of Delaware
Filed Dec. 31, 1962, Ser. No. 248,526
7 Claims. (Cl. 235—151)

This invention relates to control apparatus and more particularly to analogue to digital converters utilizing magnetic field sensing devices, one possible example of such devices being nuclear magnetic resonance devices.

For some applications it is desirable to be able to measure the difference of the squares of a pair of currents. The present invention provides a unique apparatus which produces a rigital output indicative of the difference between the squares of two currents.

In the present invention, two variable currents are utilized to produce two magnetic fields, one of which is variable in accordance with the sum of the first current plus the second current, and the first current minus the second current, and the other of which is variable in accordance with the difference between the first current plus the second current and the first current minus the second current. First and second magnetic field sensing devices such as nuclear magnetic resonance devices are placed within the magnetic fields in a manner to cause them to produce a first and second frequency variable in accordance with the variations of the first and second magnetic fields. An example of a nuclear magnetic resonance device which may be utilized is set forth in United States patent, Re. 23,950, granted February 22, 1955, to Felix Bloch et al.

The two frequencies are then applied to a subtracting means and to an adding means. The subtracting means and the adding means may actually be a portion of a digital computer, the operation of which is well known in the art, or they may be simple heterodyning and filtering means. The output of the subtracting means and the output of the adding means are then applied to a multiplying means which may be a portion of a digital computer. The output of the multiplying means, as will be shown more fully later, is proportional to the difference of the squares of the current applied to produce the two magnetic fields.

Thus, a novel invention is disclosed to the difference between the squares of the currents applied.

It is a primary object of this invention to provide an improved control apparatus.

It is a further object of this invention to provide an apparatus producing a digital output proportional to the difference between the squares of two currents applied thereto.

Figure 2:
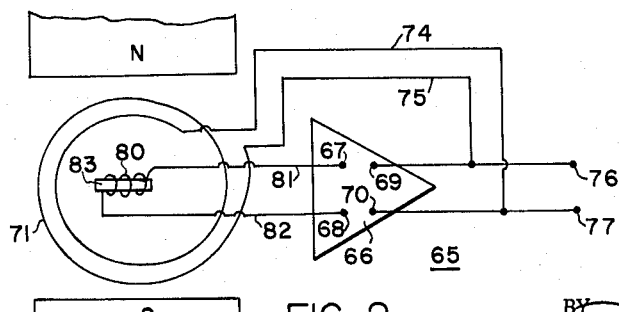

Other objects of the invention will be set forth more fully in and become apparent from a reading of the following specification and claims in conjunction with the accompanying drawings in which:

FIGURE 1 is a partial cutaway view of the magnetic circuitry and includes a block diagram of the electrical circuitry attached thereto; and FIGURE 2 is a somewhat schematic presentation of an NMR spin oscillator.

In FIGURE 1, the numeral 10 designates a hollow cylindrical housing member closed at both ends by disc-shaped end caps 11 and 12. The end caps 11 and 12 have threaded portions and are constructed to screw onto threaded portions of the cylindrical housing member 10. This is for ease of construction and the end caps may be attached in many other fashions. Housing member 10 and end caps 11 and 12 are constructed of some permeable magnetic material.

A plurality of rod-shaped members, in this embodiment three, are mounted concentric with cylindrical housing member 10 and in general end to end relationship along its axial length. These rod-shaped members may be mounted by a variety of means and the following is simply a preferred means. First, rod-shaped member 14 is threaded at one end and is illustrated in FIGURE 1 screwed into a centrally located, threaded aperture in end cap 11. One end of rod-shaped member 14 protrudes through end cap 11 and has a tool engaging means or slot 15 therein for convenience in adjusting with a screwdriver, as will be explained later. A second rod-shaped member 17 is concentrically mounted along the axial length of housing member 10 by means of passing through a central aperture in a centrally located disc-shaped portion 18. Disc-shaped portion 18 is shown as an integral portion of housing member 10 and it should be noted that rod-shaped member 17 could also be an integral portion of disc-shaped member 18. This could be accomplished by molding or forming the whole device in one solid piece. A third rod-shaped member 19 is constructed similar to rod-shaped member 14 and is screwed onto a centrally located threaded aperture in end cap 12. Rod shaped member 19 also has a slot, not shown, for making screwdriver adjustments to be explained later. Rod-shaped members 14, 17 and 19 and the centrally located disc portion 18 are all composed of the same permeable magnetic material from which cylindrical housing 10 and end caps 11 and 12 are constructed.

A coil 25 is wound around rod-shaped member 14 and is shown in FIGURE 1 in schematic form for convenience. Coil 25 in this embodiment is made up of two insulated wires or conductors bifilar wound. However, this type of winding is simply the preferred embodiment and is not to limit the invention in any way as a variety of windings could be thought of by one skilled in the art. A first current $I_1$ enters coil 25 by means of a lead 26 and leaves the coil by means of a lead 27. Current $I_1$ travels through one conductor of coil 25 in a manner to produce a magnetic flux in rod-shaped member 15 in the direction indicated by dotted arrow 28. That is to say, the innermost end (the right hand end in FIGURE 1) of rod-shaped member 14 looks like a north pole and the threaded end (the left hand end in FIGURE 1) appears to be a south pole. A second current $I_2$ enters the other conductor of coil 25 by means of a lead 29 and leaves the coil by means of a lead 30. Current $I_2$ travels through the winding 25 in a direction to produce a magnetic flux in rod-shaped member 14 in the opposite direction of the flux produced by current $I_1$, as indicated by dotted arrow 31. Thus, the flux in rod-shaped member 14 due to the current $I_1$ in coil 25 and the flux due to current $I_2$ in coil 25 react to produce a total flux which is the difference between the two. Leads 26 and 29 pass through a small aperture 32 in end cap 11 for ease in making external connections thereto.

A coil 35 and a coil 36, similar to coil 25, are wound around rod-shaped member 17. Coil 35 is wound around the end of rod-shaped member 17 protruding from disc-shaped portion 18 toward rod-shaped member 14 and coil 36 is wound around the end of rod-shaped portion 17 protruding from disc-shaped portion 18 towards rod-shaped portion 19. Lead 27 attaches to one conductor of coil 35 and allows current $I_1$ to pass therethrough and produce a magnetic flux in rod-shaped member 17 in the direction indicated by dotted arrow 37, that is, from left to right in FIGURE 1. Lead 30 attaches to the other conductor of coil 35 and allows current $I_2$ to pass therethrough and produce a magnetic flux in rod-shaped member 17 in the direction indicated by the dotted arrow 38, that is, from left to right in FIGURE 1. It should be noted from the direction of dotted arrow 37 and dotted arrow 38 that both conductors of coil 35 produce magnetic flux which flows in the same direction and, thus, react to produce a total flux which is the sum of the two. A lead 39 and a lead 40 pass through a small aperture 41 in disc-shaped portion 18 and connect the two conductors of coil 35 to the two conductors of coil 36 so that currents $I_1$ and $I_2$ pass through coil 36 and produce magnetic fluxes in rod-shaped member 17 in the same direction as the magnetic fluxes produced by coil 35.

A fourth coil 45, similar to coil 25, is wound about rod-shaped member 19. The current $I_1$ travels from coil 36 to one conductor of coil 45 by means of a lead 46. Current $I_1$ travels through coil 45 in a direction to produce a magnetic flux in rod-shaped member 19 in the direction indicated by dotted arrow 47, that is, opposite to the flux in rod-shaped member 17. Current $I_2$ passing from coil 36 is connected to the other conductor of coil 45 by means of a lead 48. Current $I_2$ passes through coil 45 in a direction to produce a magnetic flux in rod-shaped member 19 in a direction which is opposite to the flux produced by current $I_1$, as indicated by the dotted arrow 49. The flux in rod-shaped member 19 produced by current $I_1$ and the flux produced by current $I_2$ react to produce a total flux which is the difference between the two. A lead 50 attached to the conductor 45 passes through a small aperture 51 in end cap 12 and allows the circuit for current $I_1$ to be completed externally. A lead 52 connected to coil 45 passes through aperture 51 and allows the circuit for current $I_2$ to be completed externally. The external circuits for $I_1$ and $I_2$ are not completed in FIGURE 1, since the completed circuit is not part of the present invention.

Rod-shaped member 14 and rod-shaped member 17 are positioned so as to form an air gap 55 therebetween. The magnetic flux produced by coils 25 and 35 pass through the air gap, a portion of rod-shaped member 17, disc-shaped member 18, a portion of cylindrical housing 10, end cap 11, and back to the air gap through rod-shaped member 14 to complete the magnetic circuit. It should be noted that air gap 55 is completely surrounded by the magnetic material making up the magnetic circuit and, thus, only the magnetic flux produced by coils 25 and 35 will appear therein. Rod-shaped member 17 and rod-shaped member 19 form an air gap 56 therebetween. The magnetic flux produced by windings 36 and 45 travels around the magnetic circuit provided by air gap 56, rod-shaped member 19, end cap 12, a portion of the cylindrical housing member 10, disc-shaped member 18 and a portion of rod-shaped member 17. The air gap 56 is completely surrounded by the magnetic material providing a magnetic circuit and, therefore, the flux appearing across air gap 56 will only be the magnetic flux produced by coils 36 and 45. The screwdriver adjustment 15 at the end of rod-shaped member 14 and the one, not shown, at the end of rod-shaped member 19 provide an external means of adjusting the air gaps 55 and 56 to the same size. Also, in case a change in the air gap size is desired after the device is constructed, this can be conveniently accomplished externally.

Mounted within air gap 55, by suitable means not shown, is a block 60 representative of a magnetic field sensing device which in this preferred embodiment is a nuclear magnetic resonance device. A block 61 containing a similar nuclear magnetic resonance device is mounted, by suitable means not shown, within air gap 56. An example of a nuclear magnetic resonance device which may be utilized in blocks 60 and 61 is shown in FIGURE 2. The nuclear magnetic resonance device illustrated in FIGURE 2 is an NMR spin generator 65. Spin generator 65 has an amplifier 66 with a pair of input terminals 67 and 68 and a pair of output terminals 69 and 70. A first winding means 71 is comprised of a single cylindrical coil with a comparatively large diameter. This coil is mounted, by means not shown, along an axis which is perpendicular to the plane of the paper. Winding means 71 is connected to output terminals 69 and 70 of amplifier 66 by means of a pair of leads 74 and 75. Thus, winding means 71 is energized by any output from amplifier 66 and is in effect an alternating field producing means. Output means for the complete device are depicted by a pair of terminals 76 and 77. Terminal 76 is connected to output terminal 69 of amplifier 66 and terminal 77 is connected to output terminal 70 of amplifier 66.

A sensitive coil or sensing means 80 is comprised of a cylindrical coil of much smaller diameter than cylindrical coil 71. One end of coil 80 is connected to input terminal 67 of amplifier 66 by means of a lead 81 and the other end of cylindrical coil 80 is connected to the other input terminal 68 of amplifier 66 by means of a lead 82. Coil 80 is mounted, by means not shown, with the aperture of the winding means 71 so the cylindrical axis of coil 80 is perpendicular to the cylindrical axis of winding means 71. By mounting coil 80 along the axis substantially perpendicular to the axis along which winding means 71 is mounted, very little if any mutual coupling is present therebetween.

A means of producing a magnetic field consists of a north pole designated N and a south pole designed S. The poles are shown as unitary poles for convenience in explanation but it should be noted that any means of producing a north and south pole would be satisfactory. These poles N and S are mounted, by means not shown, so that a field is set up along an axis mutually perpendicular to the cylindrical axis of coil 80 and winding means 71. Poles N and S are further mounted so that coil 80 and winding means 71 are approximately centrally located therebetween. This is to insure as uniform a magnetic field as possible under the given conditions.

For the operation of spin oscillator 65 a sample 83 is placed within coil 80. Sample 83 is comprised of a diamagnetic material or some material with atoms having nuclei with nonzero magnetic moments. The nuclei of the atoms in sample 83 may be thought of as spinning bar magnets. When a magnetic field is applied to sample 83 by some means such as magnetic poles N and S the nuclei of the atoms tend to react as bar magnets and eventually align with the magnetic field. However, because of the spin of the nuclei a gyroscopic action occurs and the nuclei precess about their precission axes. The nuclei having precession axes which are aligned with the spin of the magnet induce a voltage into coil 80. The magnitude of this induced voltage will depend upon the amount of precession and number of nuclei aligned. This induced voltage will be an alternating voltage and the frequency will be dependent upon the magnitude of the magnetic field, produced by magnetic poles N and S, and the type of material used in sample 83. The voltage induced in coil 80 is applied to amplifier 66, amplified and appears at output terminals 76 and 77. The amplified voltage is also applied to winding means 71 by means of leads 74 and 75.

The voltage from amplifier 66 alternating at the precession frequency, energizes winding means 71. Since winding means 71 is energized at the precession frequency of the nuclei, in the atoms of sample 83, it produces an alternating magnetic field, and this field is perpendicular to the magnetic field produced by magnetic poles N and S. Since winding means 71 and coil 80 have a negligible amount of mutual coupling therebetween, the energization of winding means 71 has no effect on coil 80 directly. This alternating magnetic field is alternating at the precession frequency of the nuclei in the atoms of sample 83 and adds to the precession of the nuclei vectorially causing them to precess further. The alternating magnetic field may be thought of as being regenerative or as giving the nuclei a push at just the proper moment to cause them to precess further. As the nuclei precess further a larger voltage is induced in coil 80 which is amplified by amplifier 66 and applied to winding means 71 causing the alternating magnetic field to become stronger. This increase of induced energy continues until the nuclei reach a maximum point or until the point at which the losses of the circuit just equal the energy applied.

It should be understood that this explanation of the operation of an NMR device has been greatly simplified and if more information concerning the NMR energy device shown in FIGURE 2, or concerning nuclear magnetic resonance in itself, is desired, reference may be made to the previously cited patent of Bloch et al.

Since the frequency at which the magnetic resonance spin generator operates is directly proportional to the magnitude of the magnetic field produced by magnetic poles N and S, if these poles are replaced with the ends of rod shaped member 14 and rod-shaped member 17, as shown in FIGURE 1, the nuclear magnetic resonance spin oscillator would produce a frequency at its output terminals which is proportional to the flux in air gap 55 produced by coils 25 and 35. Thus, the nuclear magnetic resonance device 60 in air gap 55 produces a signal on a pair of output leads 85 and 86 having a frequency proportional to the magnetic flux in air gap 55. The magnetic flux in air gap 55 is proportional to the sum of the two currents flowing through coil 35, since they are both flowing in the same direction, plus the difference between the two currents flowing through coil 25, since they are flowing in different directions. Since the frequency produced by nuclear magnetic resonance device 60 is proportional to the flux in air gap 55 the following formula describes the relationship between the frequency, designated $F_1$, and the currents $I_1$ and $I_2$.

$$F_1 = K_2(I_1+I_2) + K_1(I_1-I_2)$$

In a like manner, the flux in air gap 56 is proportional to the sum of the two currents flowing through coil 36, since they are both flowing in the same direction, minus the difference between the two currents flowing through coil 45, since they are both flowing in opposite directions. Thus, the voltage produced by nuclear magnetic resonance device 61 will vary at a frequency, designated $F_2$, which is related to the currents $I_1$ and $I_2$ in the following manner.

$$F_2 = K_2(I_1+I_2) - K_1(I_1-I_2)$$

The output signal of the nuclear magnetic resonance device 61 appears on a pair of leads 87 and 88.

The leads 85 and 86 from nuclear magnetic resonance device 60 pass through a small aperture 90 in the side of the cylindrical housing 10 and are connected to two exterior junction points 91 and 92 respectively. The output leads 87 and 88 from nuclear magnetic resonance device 61 pass through an aperture 93 in the side of cylindrical housing 10 and are connected to two external junction points 94 and 95, respectively. Junction points 91, 92, 94 and 95 are inputs to a computing means 100. Contained within the major computing means 100 are a subtracting means 101, an adding means 102, and a multiplying means 103. The subtracting, adding and multiplying means contained within the computing means 100 may simply be different steps in a digital process of a digital computer, as is well known in the art, or they may be various heterodyning circuits which are also well known in the art.

Subtracting means 101 has a first input connected to junction points 91 and 92 by means of leads 105 and 106 respectively. A second input to subtracting means 101 is connected to junction points 94 and 95 by means of leads 108 and 107 respectively. A first input to adding menas 102 is connected to junction points 91 and 92 by means of a pair of leads 109 and 110 respectively. A second input to adding means 102 is connected to junction points 94 and 95 by means of leads 111 and 112 respectively.

Subtracting means 101 has a single output which is the difference between the frequency $F_1$ at the first input and the frequency $F_2$ at the second input. The output of subtracting means 101 is applied to a first input of multiplying means 103 by means of a pair of leads 113 and 114. The output of adding means 102 is the sum of the frequency $F_1$ appearing at the first input and the frequency $F_2$ appearing at the second input. The output of adding means 102 is applied to a second input of multiplying means 103 by means of a pair of leads 115 and 116. Multiplying means 103 has an output appearing on a pair of leads 117 and 118 which is the product of the output of subtracting means 101 and the output of adding means 102.

The output of subtracting means 101 is illustrated mathematically by the formula $$F_1 - F_2 = 2K_1(I_1-I_2)$$

The output of adding means 102 is illustrated mathematically by the formula $$F_1 + F_2 = 2K_2(I_1+I_2)$$

The signals which the two above formulas describe are applied to the two inputs of multiplying means 103 to produce an output on leads 117 and 118 which is mathematically described by the formula $$F_1^2 - F_2^2 = (F_1+F_2)(F_1-F_2) = 4K_1K_2(I_1^2-I_2^2)$$

Thus, it can be seen that the output signal on leads 117 and 118 is a digital signal indicative of the difference between the squares of the current $I_1$, applied to the device by means of leads 26 and 50, and $I_2$, applied to the device by means of leads 29 and 52.

Thus, a novel device has been disclosed for producing a digital output indicative of the difference between the squares of a pair of currents applied to the input thereof. This device is cheaply and easily constructed and, if a nuclear magnetic resonance device is used for the magnetic field sensing device, has the accuracy inherent in the nuclear magnetic resonance devices because of the unvarying precession frequencies of the nuclei of a given material.

While there are many applications in which it is desirable to be able to measure the difference of the squares of a pair of currents one such application is disclosed in the copending application of Leo Spiegel, filed, December 26, 1962, Serial No. 247,242, and assigned to the same assignee as the present application.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. An analogue to digital converter of the class described comprising: first and second nuclear magnetic resonance devices, each having a sensitive coil and an output providing a signal having a frequency proportional to magnetic flux applied to said sensitive coil; a first magnetic field variable in accordance with the sum of a first current plus a second current and said first current minus said second current; a second magnetic field variable in accordance with the difference between said first current plus said second current and said first current minus said second current; means mounting said sensitive coil of said first nuclear magnetic device within said first magnetic field and said sensitive coil of said second nuclear magnetic device within said second magnetic field; summing means having an output which is the sum of a first and second freqeuncy applied thereto; subtracting means having an output which is the difference between a first and second frequency applied thereto; multiplying means; means connecting said outputs of said first and second nuclear magnetic resonance devices to said summing means and said subtracting means; and means connecting said outputs of said summing means and said subtracting means to said multiplying means, said multiplying means producing an output proportional to the square of said first current minus the square of said second current.

2. An analogue to digital converter of the class described comprising: a self shielding magnetic housing, said housing having a hollow cylindrical configuration with a plurality of magnetic rod-shaped members mounted approximately concentrically therein and forming first and second air gaps therebetween, said housing and said rod-shaped members forming two independent magnetic circuits each having one of said air gaps therein; first and second nuclear magnetic resonance devices, each having a sensitive coil and an output providing a signal having a frequency proportional to magnetic flux applied to said sensitive coil; means for providing a magnetic field in said first air gap variable in accordance with the sum of a first current plus a second current and said first current minus said second current; means for providing a magnetic field in said second air gap variable in accordance with the difference between said first current plus said second current and said first current minus said second current; means mounting said sensitive coil of said first nuclear magnetic device within said first air gap and said sensitive coil of said second nuclear magnetic device within said second air gap; summing means having an output which is the sum of a first and second frequency applied thereto; subtracting means having an output which is the difference between a first and second frequency applied thereto; multiplying means; means connecting said outputs of said first and second nuclear magnetic resonance devices to said summing means and said subtracting means; and means connecting said outputs of said summing means and said subtracting means to said multiplying means, said multiplying means producing an output proportional to the square of said first current minus the square of said second current.

3. The apparatus of claim 2 in which the means for providing a magnetic field in said first air gap and the means for providing a magnetic field in said second air gap comprise windings about said plurality of magnetic rod-shaped members adapted to conduct said first and second currents in directions suitable to generate magnetic flux within said plurality of magnetic rod-shaped members, which flux is representative of the sum of said first and second currents in some of the rod-shaped members and representative of the difference between said first and second currents in the other rod-shaped members.

4. An analogue to digital converter of the class described comprising: first and second magnetic field sensing devices, each having a sensitive coil and an output providing a signal having a frequency proportional to magnetic flux applied to said sensitive coil; a first magnetic field variable in accordance with the sum of a first current plus a second current and said first current minus said second current; a second magnetic field variable in accordance with the difference between said first current plus said second current and said first current minus said second current; means mounting said sensitive coil of said first magnetic field sensing device within said first magnetic field and said sensitive coil of said second magnetic field sensing device within said second magnetic field; summing means having an output which is the sum of a first and second frequency applied thereto; subtracting means having an output which is the difference between a first and second frequency applied thereto; multiplying means; means connecting said outputs of said first and second magnetic field sensing devices to said summing means and said subtracting means; and means connecting said outputs of said summing means and said subtracting means to said multiplying means, said multiplying means producing an output proportional to the square of said first current minus the square of said second current.

5. An analogue to digital converter of the class described comprising: a self shielding magnetic housing, said housing having a hollow cylindrical configuration with a plurality of magnetic rod-shaped members mounted approximately concentrically therein and forming first and second air gaps therebetween, said housing and said rod-shaped members forming two independent magnetic circuits each having one of said air gaps therein; first and second magnetic field sensing devices, each having an output providing a signal having a frequency proportional to magnetic flux; means for providing a magnetic field in said first air gap variable in accordance with the sum of a first current plus a second current and said first current minus said second current; means for providing a magnetic field in said second air gap variable in accordance with the difference between said first current plus said second current and said first current minus said second current; means mounting said first magnetic field sensing device within said first air gap and said second magnetic field sensing device within said second air gap; summing means having an output which is the sum of a first and second frequency applied thereto; subtracting means having an output which is the difference between a first and second frequency applied thereto; multiplying means; connecting said outputs of said first and second magnetic field sensing devices to said summing means and said subtracting means; and means connecting said outputs of said summing means and said subtracting means to said multiplying means, said multiplying means producing an output proportional to the square of said first current minus the square of said second current.

6. The apparatus of claim 5 in which the means for providing a magnetic field in said first air gap and the means for providing a magnetic field in said second air gap comprise windings about said plurality of magnetic rod-shaped members adapted to conduct said first and second currents in directions suitable to generate magnetic flux within said plurality of magnetic rod-shaped members, which flux is representative of the sum of said first and second currents in some of the rod-shaped members and representative of the difference between said first and second currents in the other rod-shaped members.

7. Apparatus for indicating the difference between the squares of two current values comprising:

a hollow cylindrical housing adapted to support first, second, and third rod-shaped members concentrically therein, said first and second rod-shaped members having a first gap therebetween and forming a first magnetic circuit with said housing and said second and third rod-shaped members having a second gap therebetween and forming a second magnetic circuit with said housing;

first and second magnetic field sensing devices positioned within said first and second gaps respectively, each device having an output signal with a frequency proportional to the magnetic flux passing therethrough;

first and second windings about said first rod-shaped member adapted to conduct a first and second current respectively, wound so as to generate flux in said first rod-shaped member and said first magnetic circuit proportional to the difference between said first current and said second current;

third and fourth windings about said second rod-shaped member, adapted to conduct said first and second currents, wound so as to generate flux in said second rod-shaped member and said first magnetic circuit proportional to the sum of said first and second current, so that the flux in said first gap is variable in accordance with the difference between said first current plus said second current and said first current minus said second current;

fifth and sixth windings about said second rod-shaped member adapted to conduct said first and second currents, wound so as to generate flux in said second rod-shaped member and said second magnetic circuit proportional to the sum of said first and second currents;

seventh and eighth windings about said third rod-shaped member, adapted to conduct said first and second currents, wound so as to generate flux in said third rod-shaped member and said second magnetic circuit proportional to the difference between said first and second currents, so that the flux in said second gap is variable in accordance with the sum of said first current plus said second current and said first current minus said second current;

summing means connected to said first and second magnetic field sensing devices having an output which is the sum of a first and second frequency supplied by said first and second field sensing devices;

subtracting means connected to said first and second field sensing devices having an output which is the difference between said first and second frequency supplied by said first and second field sensing devices; and multiplying means connected to said summing means and said subtracting means producing an output proportional to the product of the output of said summing means and the output of said subtracting means.

References Cited by the Examiner

UNITED STATES PATENTS

| | | | |
|---|---|---|---|
| 2,764,676 | 9/1956 | Bradley | 324—0.5 X |
| 2,793,360 | 5/1957 | Beaumont | 324—0.5 X |
| 3,014,210 | 12/1961 | Beaumont | 324—0.5 X |
| 3,114,103 | 12/1963 | Serson | 324—0.5 |
| 3,167,706 | 1/1965 | Doyle | 324—0.5 |
| 3,172,055 | 3/1965 | Abrahamson et al. | 324—0.5 X |

MALCOLM A. MORRISON, *Primary Examiner.*

I. KESCHNER, *Assistant Examiner.*